(12) United States Patent
Tartz et al.

(10) Patent No.: US 9,575,557 B2
(45) Date of Patent: Feb. 21, 2017

(54) GRIP FORCE SENSOR ARRAY FOR ONE-HANDED AND MULTIMODAL INTERACTION ON HANDHELD DEVICES AND METHODS

(71) Applicant: QUALCOMM Incorporated, San Diego, CA (US)

(72) Inventors: Robert S. Tartz, San Marcos, CA (US); Richard O. Farley, San Diego, CA (US); Clayton G. Dumstorff, San Diego, CA (US); Jay S. King, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/866,502

(22) Filed: Apr. 19, 2013

(65) Prior Publication Data

US 2014/0317722 A1 Oct. 23, 2014

(51) Int. Cl.

| G06F 3/041 | (2006.01) |
|---|---|
| G06F 3/01 | (2006.01) |
| G06F 21/32 | (2013.01) |
| H04W 12/06 | (2009.01) |
| G06F 3/0487 | (2013.01) |
| G06F 1/16 | (2006.01) |
| H04W 88/02 | (2009.01) |

(52) U.S. Cl.
CPC ............. *G06F 3/011* (2013.01); *G06F 1/1684* (2013.01); *G06F 3/0487* (2013.01); *G06F 21/32* (2013.01); *H04W 12/06* (2013.01); *H04W 88/02* (2013.01)

(58) Field of Classification Search
CPC ...... G06F 3/011; G06F 1/1684; G06F 3/0487; G06F 21/32; H04W 12/06; H04W 88/02

USPC .......................................................... 345/173
See application file for complete search history.

(56) References Cited

U.S. PATENT DOCUMENTS

| 5,774,571 | A  | * | 6/1998 | Marshall ....................... 382/119 |
|---|---|---|---|---|
| 7,725,824 | B2 |   | 5/2010 | Ono et al. |
| 8,351,993 | B2 |   | 1/2013 | Nunes |
| 8,416,148 | B1 | * | 4/2013 | Park ............................... 345/1.1 |
| 2006/0023922 | A1 | * | 2/2006 | Black ............................ 382/115 |
| 2006/0285725 | A1 | * | 12/2006 | Recce .................... B60R 25/04 382/115 |

(Continued)

FOREIGN PATENT DOCUMENTS

| EP | 2662797 A1 | 11/2013 |
|---|---|---|
| WO | WO-2013005840 A1 | 1/2013 |

OTHER PUBLICATIONS

Chang W. et al., "Recognition of Grip-Patterns by Using Capacitive Touch Sensors,"in Proc. International Symposium on Industrial Electronics (ISIE2006), Jul. 9-12, 2006, DOI: 10.1109/ISIE.2006.296083, XP055049941, pp. 2936-2941.

(Continued)

*Primary Examiner* — Jonathan Boyd
(74) *Attorney, Agent, or Firm* — Loza & Loza LLP

(57) ABSTRACT

Aspects of the disclosure relate to a handheld device equipped with arrays of force sensors located along both sides of the device that can provide a novel user interface for operating the device. The sensors can be configured to recognize various grip patterns, gestures, and biometric information of a user operating the device. Using the arrays of force sensors in addition to a touchscreen, a new paradigm for operating a handheld device is provided.

40 Claims, 15 Drawing Sheets

(56) References Cited

U.S. PATENT DOCUMENTS

| | | |
|---|---|---|
| 2010/0007618 A1 | 1/2010 | Park et al. |
| 2010/0187023 A1* | 7/2010 | Min ..................... G06F 1/1662 |
| | | 178/18.09 |
| 2011/0069024 A1* | 3/2011 | Kim .............................. 345/173 |
| 2011/0167391 A1 | 7/2011 | Momeyer et al. |
| 2012/0270605 A1 | 10/2012 | Garrone et al. |

OTHER PUBLICATIONS

International Search Report and Written Opinion—PCT/US2014/034237—ISA/EPO—Aug. 22, 2014.
Hoggan, et al., "Pressages: Augmenting Phone Calls with Non-Verbal Messages", UIST '12, Oct. 7-10, 2012, pp. 555-562.

\* cited by examiner

GRIP FORCE SENSOR ARRAY FOR ONE-HANDED AND MULTIMODAL INTERACTION ON HANDHELD DEVICES AND METHODS

TECHNICAL FIELD

Aspects of the present disclosure relate generally to a user interface for a handheld device, and more particularly, to a user interface for a handheld device utilizing force sensors.

BACKGROUND

A touchscreen display is a user interface commonly used in recent handheld devices, for example, a cellular phone, a personal digital assistant (PDA), a smartphone, a portable multimedia player (PMP), a tablet computer, a digital camera, and the like. Interactions on a touchscreen handheld device are typically confined to x and y coordinates on the touchscreen display. While additional interaction in the z-plane may be added to measure touch force, a major limitation in interacting with such handheld devices still exists because two-handed operation is generally required (i.e., holding the device with one hand while interacting with the other hand). Thus, it may be difficult to execute two-handed operations, which are often needed when a user attempts to select small targets, or when fine dynamic motor movement is required for target manipulation on the screen.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to a handheld device equipped with one or more arrays of force sensors located along one or both sides of the device, which can provide a novel user interface for operating the device. The sensors can be configured to recognize various grip patterns, gestures, and biometric information of a user operating the device. Using the arrays of force sensors in addition to a touchscreen, a new paradigm for operating a handheld device is provided.

In one aspect, the disclosure provides a handheld device including a processor and a first array of force sensors operatively coupled to the processor. The first array of force sensors is positioned along a first edge of the handheld device, and the first array is configured to detect a grip pattern. The processor is configured to the grip pattern with biometric data. In some aspects, the handheld device may further include a matrix of force sensors on a backside of the device that may be operated together with a touchscreen display of the handheld device to provide a user interface.

Another aspect of the disclosure provides a method for operating a handheld device. The handheld device may be held with one hand or both hands. A first array of force sensors positioned along a first edge of the handheld device is utilized to detect a grip pattern. The grip pattern is compared with biometric data. A user may be authenticated based on the comparison. A user interface operation is performed corresponding to the detected grip. The biometric data may include one or more predetermined grip patterns.

In some aspects of the disclosure, a distance (e.g., pitch) between adjacent sensors of the first array is substantially equal to or smaller than a width of a finger of a user.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Before the advent of touchscreens, handheld devices (e.g., mobile devices) were commonly designed for one-handed operation because mobile users often do not have two hands available during many usage scenarios and environments (e.g., carrying groceries, holding a child's hand, etc.).

While some users can interact with a touchscreen device with a single hand by using the thumb as a selector, such a method is dependent on the radial reach of the thumb. Using the thumb as a selector has proven to be difficult for users with small hands especially on larger displays when many targets are simply out of reach. Even users with large hands may have difficulty when selecting targets too close to the thumb (e.g., the bottom inside edge of the display).

Even if, for some users, radial reach of the thumb is not a problem, it is generally easier and simpler for users to manipulate targets (particularly small targets) using the index finger because fine motor movement of the thumb needed for target manipulation can be problematic especially when attempting to move or manipulate targets in certain directions. Therefore, the index finger is generally the selector of choice for most users because index finger pointing generally has more degrees of freedom than the thumb. Thus, aspects of the present disclosure are directed to mechanisms and methods that provide for improved one-handed target selection and manipulation during the operation of a handheld device.

Additionally, recent mobile devices are basically small sized computers. The interaction paradigm nearly all users are used to on PCs and laptops is via a mouse-type pointing device, which typically has at least two buttons—one used for primary target selection and manipulation and the other as a secondary sub-menu (or options menu) or some other assigned secondary functions. Aspects of the present disclosure are directed to mechanisms and methods that will allow users to more naturally interact with touchscreen handheld devices with a single hand and provide similar functionalities they have used on PCs.

Figure 1:
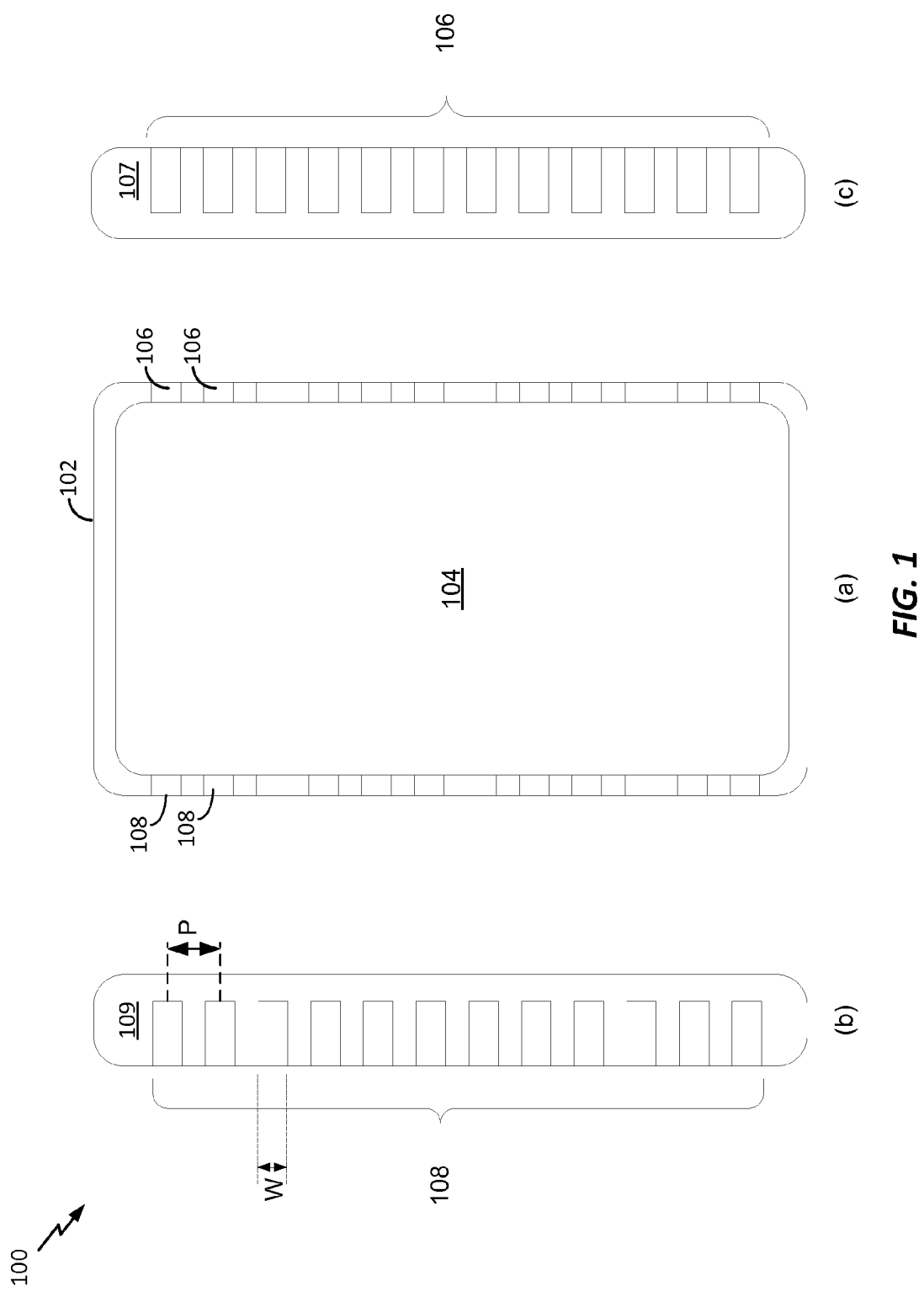
FIG. 1 is a conceptual drawing illustrating a handheld device with force sensors in a front view, a left side view, and a right side view in accordance with an aspect of the present disclosure.

FIG. 1 is a conceptual drawing illustrating a handheld device 100 in a front plan view (a), a left side view (b), and a right side view (c) in accordance with an aspect of the present disclosure. The handheld device 100 includes a main body 102 and a display portion 104 on a front side of the main body 102. The display portion 104 may have a touch sensing function (e.g., touchscreen display). In some examples, the display portion 104 may be a capacitive or resistive touchscreen. The handheld device 100 also has arrays of force sensors located along both sides of the device. For example, a first array of force sensors 106 may be positioned along the right side or edge 107 of the handheld device 100, and a second array of force sensors 108 may be positioned along the left side or edge 109 of the handheld device 100. In some aspects, the force sensors 106 and 108 may be thin film force sensors. In some aspects, the force sensors 106 and 108 may be pressure sensors. Non-limiting examples of pressure sensors include pressure transducers, pressure transmitters, pressure indicators, piezometers, manometers, and the like. Types of the pressure sensor may be piezoresistive strain gauge, capacitive type, electromagnetic type, piezoelectric type, optical, and potentiometric. The present disclosure, however, is not limited to the above-described pressure sensors. Any suitable force sensors that can detect pressure or force and supply a proportional output signal may be used.

In one aspect, a distance or pitch (P) between each force sensor may be about 1 cm center-to-center, to facilitate detection of the amount of force from each individual finger of a user holding the device. In another aspect, a width (W) of the force sensor may be about 1 cm. Thus, this arrangement may allow force to be detected from any finger placed anywhere along the sensor array. In various aspects, the width of the force sensor or the pitch between sensors may be substantially equal to or less than the width of a typical user's finger. For example, in some aspects of the disclosure, the width and/or pitch of the force sensor may be suitably selected to correspond to the nominal width of a typical finger (e.g., about 1 cm or smaller). Therefore, the user may freely place the fingers on the array of force sensors at any position while the force sensors can still detect the correct number of fingers and/or their relative positions on the array. A number of useful interactions between the user and the device may result from positioning the force sensor arrays 106 and 108 along the opposite sides of the device 100 where users are mostly likely to hold the device.

Figure 2:
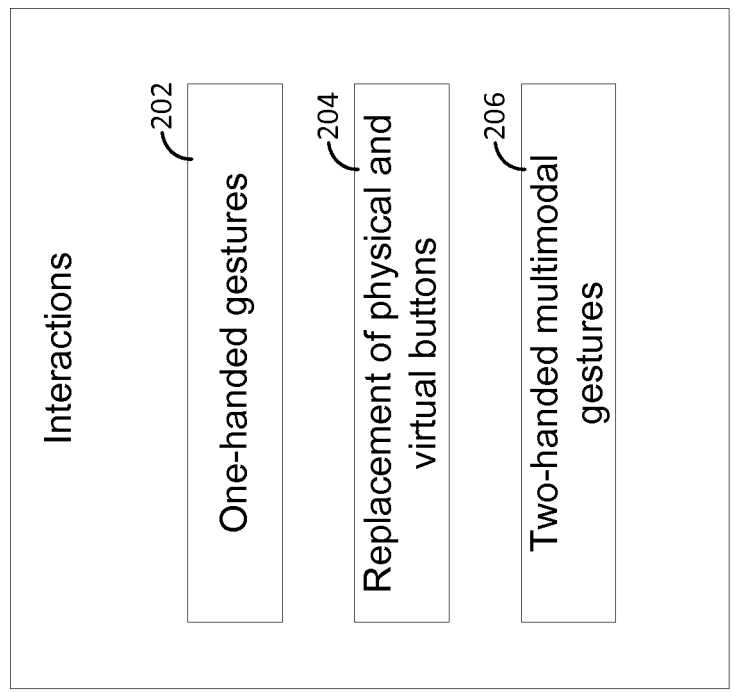
FIG. 2 is a drawing illustrating some examples of possible interactions with an array of force sensors in accordance with aspects of the disclosure.

FIG. 2 is a drawing illustrating some non-limiting examples of possible interactions with an array of force sensors in accordance with aspects of the disclosure. An array of force sensors (e.g., array 106 or 108) may facilitate various one-handed gestures 202, replacement of physical and virtual buttons 204, and two-handed multimodal gestures 206. These interactions rely on extraction of information/features/grip patterns from the force sensor arrays. A grip pattern may include both force magnitude information and position information. The array of force sensors enables the association between a grip pattern with a user input to the handheld device. More detail on these interactions will be provided below.

Figure 3:
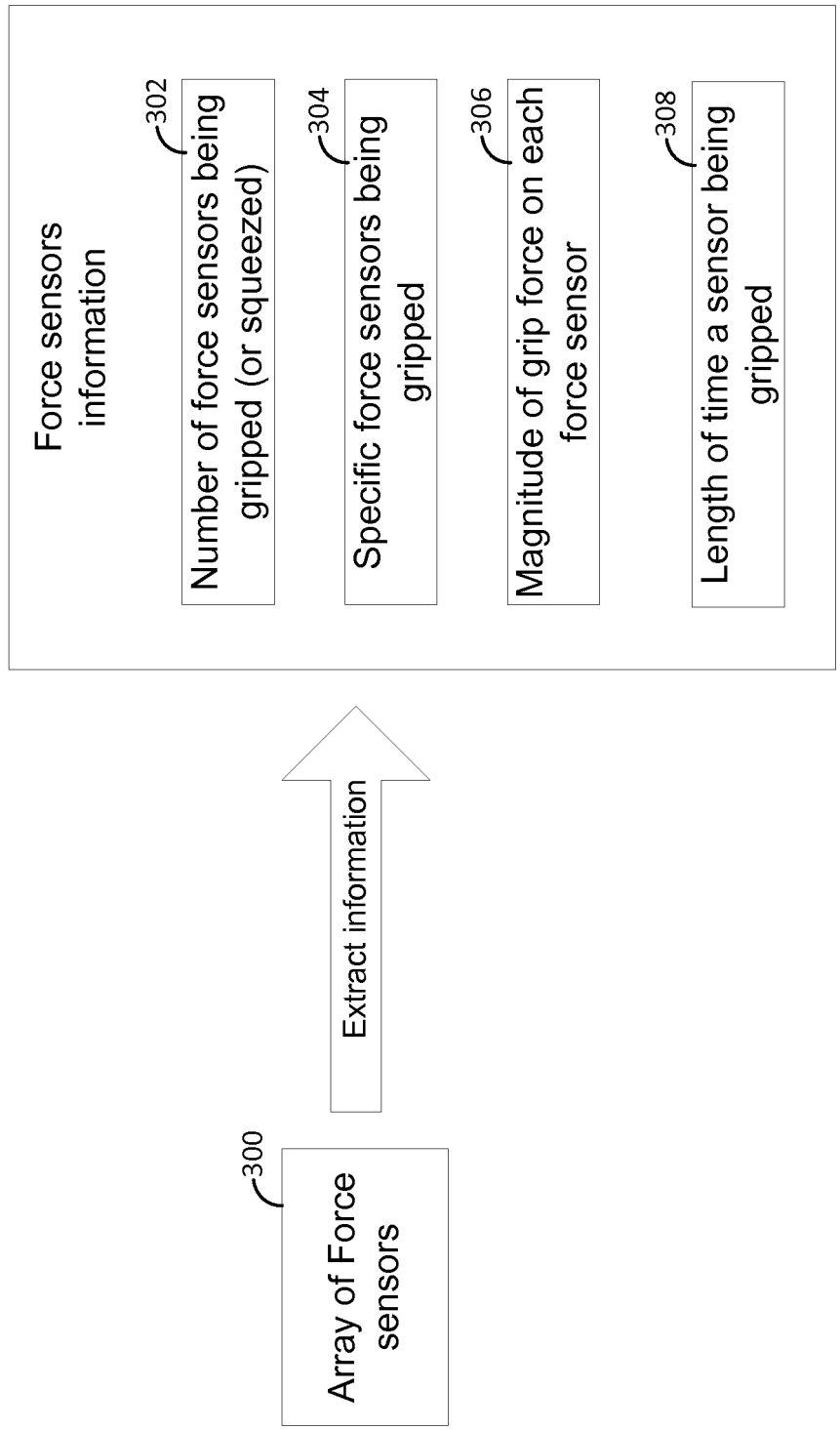
FIG. 3 is a drawing illustrating some examples of information/features that may be extracted from an array of force sensors.

FIG. 3 is a drawing illustrating some non-limiting examples of information/features that may be extracted from an array of force sensors. An array of force sensors 300 (e.g., array 106 or 108) may provide information on the number of force sensors being gripped (or squeezed) 302, the specific force sensors being gripped (e.g., location on the device) 304, the magnitude of the detected grip force on each force sensor 306, and the length of time a sensor is gripped 308. The present disclosure, however, is not limited to the above-described interactions and features. In some aspects of the disclosure, the force sensors (106 or 108) may facilitate other interactions with a handheld device, and other suitable or useful information/features may be extracted from the array of force sensors.

One-Handed Interactions

Figure 4:
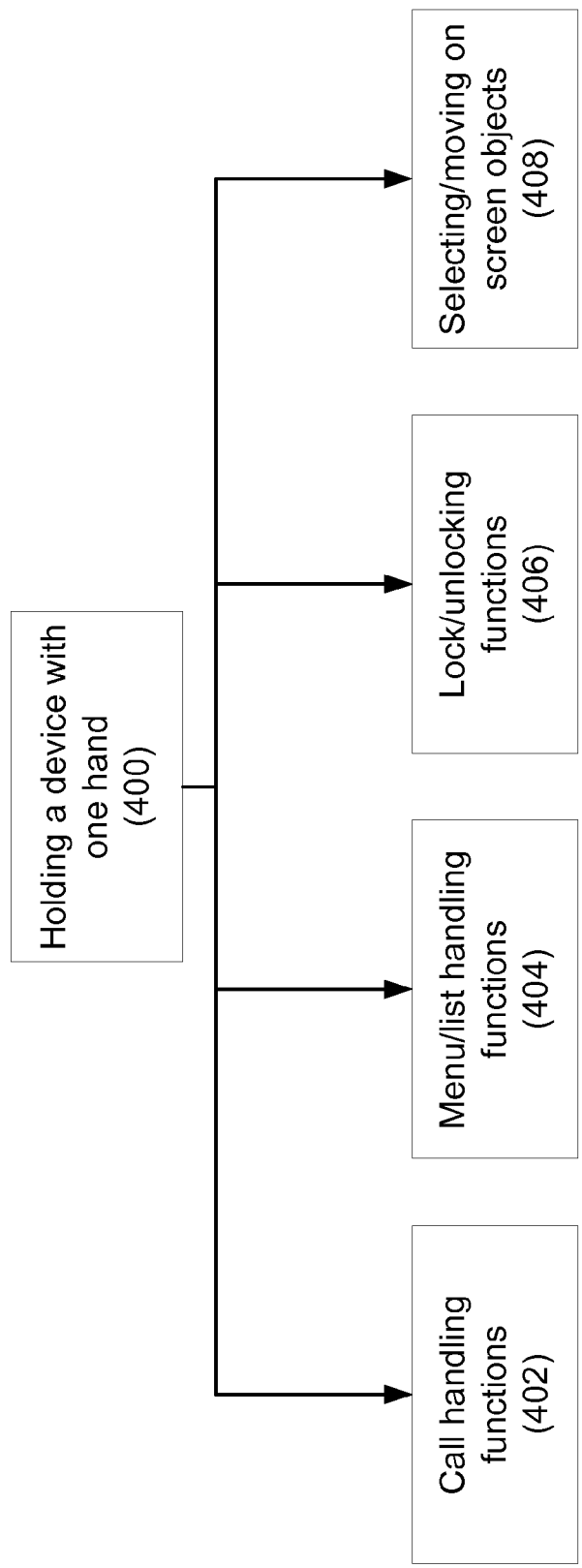
FIG. 4 is a drawing illustrating some examples of one-handed interactions operable on a mobile device in accordance with aspects of the present disclosure.

FIG. 4 is a drawing illustrating some examples of one-handed interactions operable on a mobile device in accordance with aspects of the present disclosure. The mobile device may be a handheld device 100 equipped with arrays of force sensors on opposite sides or edges. While a user holds (400) the device 100 with one hand, a number of one-handed operations may be possible as described below in more detail.

In a first usage scenario (402) (call handling function), a user may use one hand to handle call functions. For example, the user may answer a phone call by gripping or squeezing the arrays of force sensors at a certain location (e.g., near the top of the main body 102). Once in a call, the user may grip or squeeze the force sensors again to end the call (e.g., near the bottom of the main body 102). In some aspects, a user may initiate speed dialing to different numbers (e.g., wife, boss, etc.) by gripping or squeezing certain predetermined locations of the arrays using one hand.

In a second usage scenario (404) (list handling function), a user may use one hand to scroll through a menu or list displayed on the device without obstructing the display (i.e., no finger touching the display). For example, the user may grip or squeeze near the bottom of the device to cause a menu, a list page, a document, or web page to scroll down, and squeeze near the top of the device to scroll up. Scroll rate may be controlled by how hard or strong the user squeezes or grips the device. In some aspects, another method of scrolling may be performed by repeatedly sliding the thumb or finger vertically along one side of the device in order to vertically or horizontally scroll a menu or list page. Selection of a list item may be performed by squeezing both sides of the device at the vertical position where the list item resides. In some aspects, when a user scrolls a menu or list up and down the display, a region (e.g., a focus region) of the display may provide visual feedback (e.g., highlighting) to the user that the item located in the region may be selected by gripping or squeezing the device using one hand. For example, the focus region may be a predetermined location on the display or adjustable by the user during configuration.

In a third usage scenario (406), a grip pattern or sequence by one hand may unlock the device similar to the touchscreen patterns commonly used to unlock mobile devices. In one example, a user may unlock a device by short squeezing on the middle portions of the devices, then short squeezing on top portions, and then short squeezing on bottom portions of the devices. Here, the squeezing applies pressure/force on the corresponding force sensors at the squeezed portions. Other unlock patterns may also make use of squeezing time length as another variable in forming the unlock/lock patterns. For example, a user may unlock a device by short-squeezing the sensors at the top part followed by long-squeezing the bottom part. In some aspects, authentication or identification of a user may be based on biometric data (e.g., user's grip pattern) that may be stored at a mobile device equipped with the arrays of force sensors of the present disclosure. In various aspects, the width of the force sensor may be substantially equal to a nominal width (e.g., 1 cm or smaller) of a finger to facilitate grip pattern recognition.

In a fourth usage scenario (408), a user may select a small displayed target or position a cursor (or highlighter) by applying grip force to different locations. For example, the user may grip on sensors at upper or lower part of the device to position in the y-axis direction, and apply different magnitude of grip force to position in the x-axis direction. After the cursor/highlighter is positioned, a firm or strong squeeze may select the highlighted object.

Replacement of Physical Buttons

In some aspects of the disclosure, the arrays of force sensors may replace physical buttons such as volume keys, display on/off key, power on/off key, and camera key. Unlike physical buttons, the arrays of force sensors of the present disclosure have no fixed affordances, but subtle visual cues (e.g., glowing area near a sensor) may be displayed on the screen if a button or series of buttons are available within that application. Unlike physical buttons, activation or inactivation of each individual force sensor of the array may be contextually controlled depending on the application the user is currently working. With a plurality of force sensors on each side of the device, a variety of "buttons" may be rendered in various locations depending on context of use. In other words, each of the force sensors may be dynamically reconfigured to perform different functions depending on context. That is, the association between the detected grip pattern and the user input may be dynamically changed depending on context.

For example, a long firm squeeze on a certain portion (e.g., top) of the device may toggle the device on/off, while a short squeeze may toggle the display on/off. In another example, when in a call or listening to music, applying force on the sides near the top of the device may turn the device's volume up and applying force near the bottom of the device may turn the device volume down. Such a method may be superior to today's physical volume keys because users do not have to hunt for the appropriate key. In another example, two short presses to the sides may mute or unmute the call/music. In another example, when the device is held in a landscape position in a camera app, pressing the lower right side of the device may snap a picture or record video.

Replacement of Virtual Buttons

Virtual buttons are commonly used on smart devices such as the BACK key, the HOME key and the MENU key. These virtual buttons are generally provided at fixed locations on the front facing surface of a handheld device. In some aspects of the disclosure, these virtual buttons (or soft keys) may also be replaced by integrated arrays of force sensors (e.g., arrays 106 and 108) on the sides of a handheld device so that one-handed operation of the device is possible, and no display space is wasted on a handheld device. For example, the BACK key may correspond to a short squeeze near the bottom part of the device. The HOME key may correspond to a long squeeze near the bottom part of the device.

The MENU key may operate similar to the "right click" on a mouse on a PC when in an application or when an object is highlighted. Such functionality is commonly used for assigning properties to an object or manipulating an object. In some aspects of the disclosure, if on a handheld device equipped with arrays of force sensors, when an application is open or an object is highlighted and both sides (i.e., force sensors) of the device are squeezed, a submenu or options menu may be displayed or activated.

Two-Handed Multimodal Gestures

In some situations, a user may choose to operate a device (e.g., a device 100) with two hands (two-handed interface). Aspects of the disclosure provide various two-handed multimodal gestures using integrated arrays of force sensors (e.g., arrays 106 and 108) in coordination, for example, with a touchscreen. In one example, when viewing a map, squeezing the force sensors on the device may zoom into a particular point in the center of the screen. In another example, squeezing the force sensors on the device may zoom into an x, y anchor point indicated by a finger touching the display with the other hand. After zooming in, releasing grip force may zoom out the display.

Figure 14:
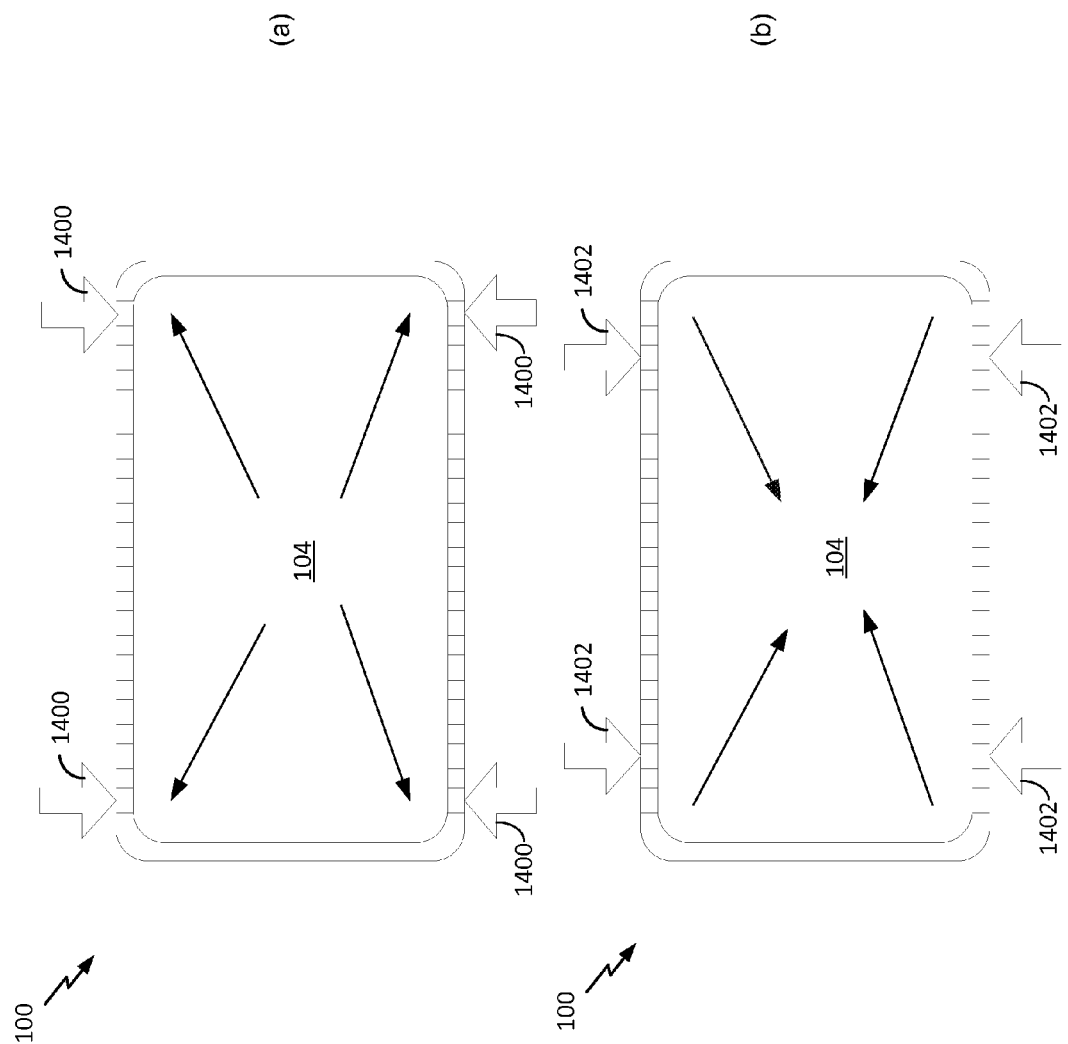
FIG. 14 is a conceptual drawing illustrating operations on a handheld device using two-handed gestures according to aspects of the disclosure.

In another example, when taking pictures using the device in camera mode, the location of the force may be used to zoom in/out an object of interest. In one aspect, when a user applies force on the right side of the device, it zooms out for a wider view; and when the user applies force on the left side, it zooms in. This can prevent or reduce occlusion of the objects in focus. FIG. 14 is a conceptual drawing illustrating operations on a handheld device 100 using two-handed gestures according to aspects of the disclosure. In FIG. 14, the device 100 may be held horizontally using two hands (not shown in FIG. 14). A user may zoom out on the display 104 by squeezing on the outermost sensors 1400 of the device 100, or zoom in on the display 104 by squeezing on the inner sensors (1402) or sliding the fingers inward on the device 100. In another aspect, a user may zoom out on the display 104 by squeezing on the left side of the device 100, or zoom in on the display 104 by squeezing on the right side of the device 100.

For some users, it may be more natural to interact with 3D interfaces on a handheld device using two hands. In aspects of the disclosure, the x and y coordinates of a display may be controlled with the finger of one hand while the z-coordinate being controlled by grip force detected by the arrays of force sensors. This method may be a simpler and more natural method of 3D interaction than using z-force detection on the display. For example, the device may be more stable during interaction using the force sensors, and 3D physical objects are commonly gripped by one hand and then manipulated with the other. This two-handed operation enabled by the arrays of force sensors may be especially useful for manipulating small 3D objects that first need to be enlarged (e.g., via squeezing) to interact with them.

In another example, when attempting to quickly scroll through long lists, users commonly use the flick gesture on a touchscreen. In one aspect of the disclosure, applying grip force to the array of force sensors on the sides of the device after a flick gesture may allow scroll speed to slow down in proportion to the grip force applied. If squeezed hard enough, the scrolling may stop or quickly slow down.

In some examples, grip force may also be used in gaming apps. In one aspect, during a racing game, applying grip force may speed up a vehicle and relaxing grip force may slow down the vehicle, while the other hand steers the vehicle. Other games may make use of the timing and/or frequency of gripping. For example, the sensors may be used to detect how fast a user can grip after a visual stimulus is shown to "catch" an object.

According to some aspects of the disclosure, other common UI interactions on handheld devices may be more intuitive by using two-handed interactions such as selecting text from a webpage, email, or other documents. For example, handheld devices commonly employ a timeout timer for text selection. A user generally positions a finger at the start of a text line and holds for a predetermined time. When the finger is removed, the device goes into a text select mode. However, this procedure often triggers false positives because the user often rests other fingers/hand on the display.

Using the force sensor arrays (e.g., arrays 106 and 108) of the present disclosure, a user may position a finger of one hand on the text line to select then "grab" the text by gripping the force sensors on the device with the other hand to begin text selection mode. Then the user moves the finger along the text to be selected and then releases grip force to stop text selection mode. The selected text may be cut or copied by further operating the touchscreen or the force sensors. The cut/copied text may be pasted later in the same application or another application installed at the device. The arrays of force sensors of the present disclosure may provide a quicker and more natural method for selecting text and trigger fewer false positives. In another aspect, a user may use a finger of one hand to select the desired text on the display, then cut or copy the selected text by gripping the device with the other hand. To paste the cut/copied text, while still gripping the device with one hand, the user positions a finger of the other hand on the desired location and releases the grip.

While some applications of the arrays of force sensors 106 and 108 on a handheld device are disclosed above, a person skilled in the art will appreciate that the arrays of force sensors may be utilized to perform other suitable operation on any handheld devices equipped with such force sensors, and the present disclosure is not limited to the above-described applications. In some aspects, the above-described applications may be used individually or in combination.

Figure 5:
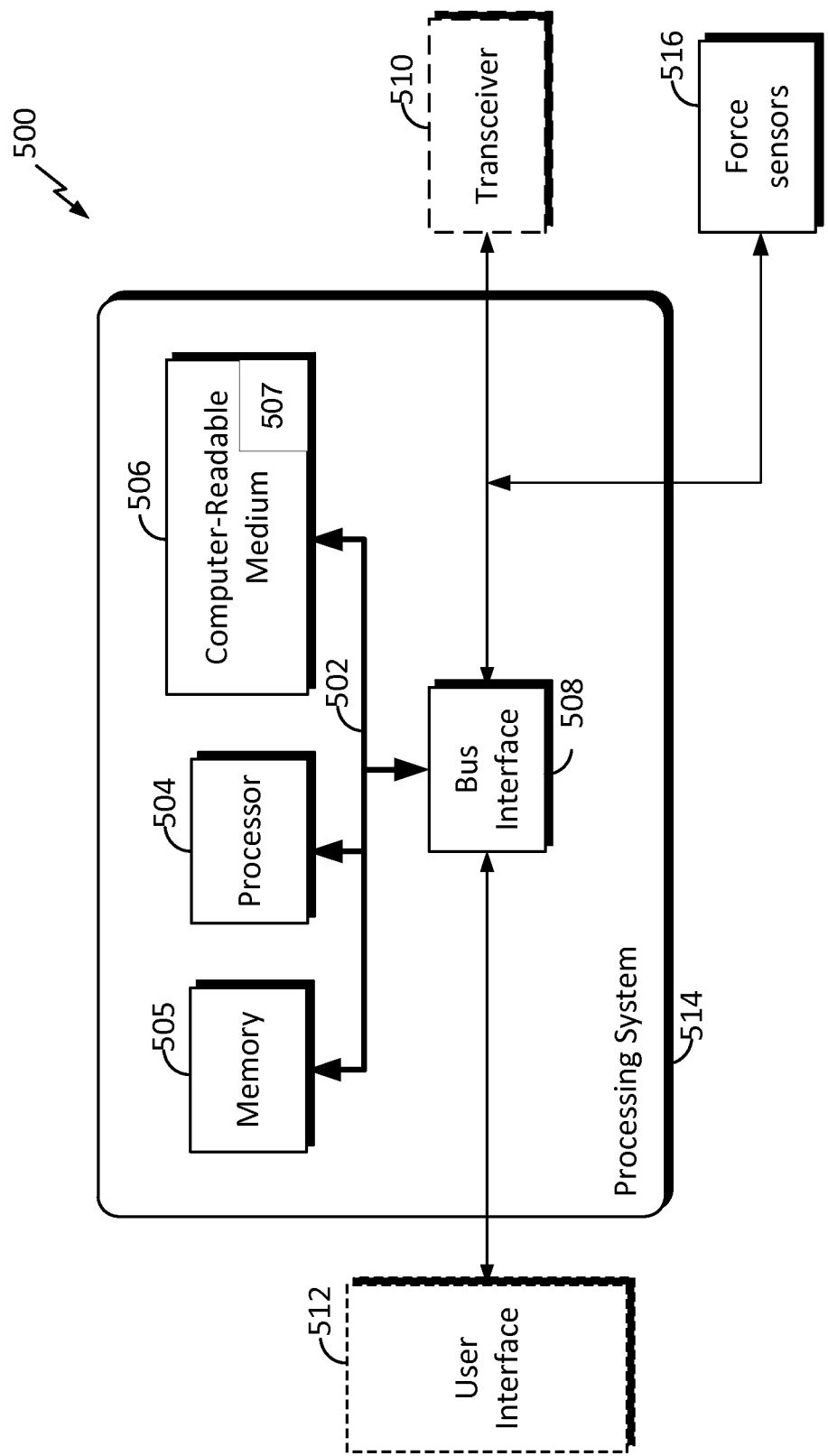
FIG. 5 is a conceptual diagram illustrating an example of a hardware implementation for an apparatus employing a processing system.

FIG. 5 is a conceptual diagram illustrating an example of a hardware implementation for an apparatus 500 employing a processing system 514. For example, the handheld device 100 may be implemented with the apparatus 500. In accordance with various aspects of the disclosure, an element, or any portion of an element, or any combination of elements may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and, optionally, a transceiver 510. The transceiver 510 provides a means for communicating with various other apparatus over a transmission medium. Depending upon the nature of the apparatus, a user interface 512 (e.g., keypad, display, speaker, microphone, joystick, touchscreen) may also be provided.

The processor 504 is responsible for managing the bus 502 and general processing, including the execution of software stored on the computer-readable medium 506. In some aspects, biometric data 507 such as a number of user specific grip patterns (e.g., predetermined grip patterns) may be stored in the computer-readable medium 506 for recognizing and/or authenticating the user by comparing a detected grip pattern with the biometric data 507 (e.g., stored grip patterns). The software, when executed by the processor 504, causes the processing system 514 to perform the various functions described infra for any particular apparatus. For example, the software may cause the processing system 514 to operate force sensors 516 to perform the above-described force sensing functions. For example, the force sensors 516 may be the arrays 106 and 108 of FIG. 1. The computer-readable medium 506 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
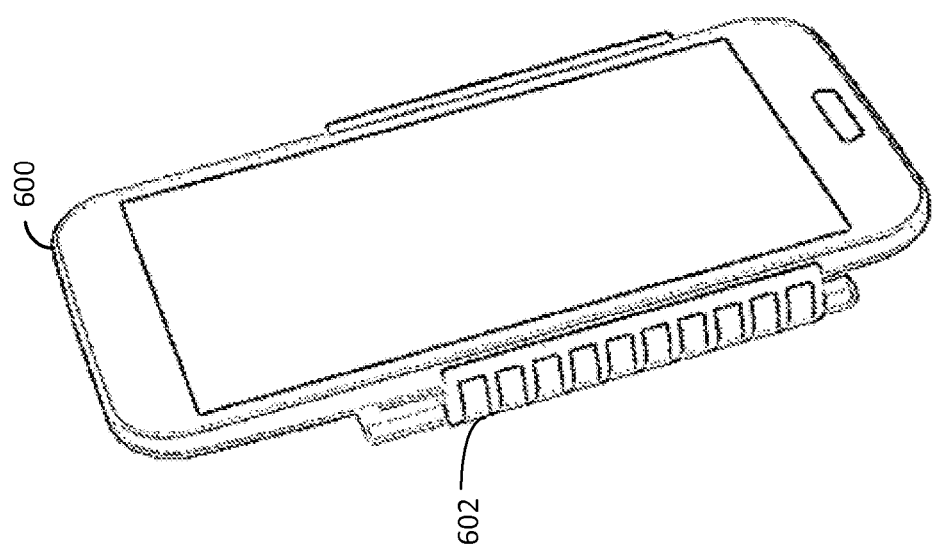
FIG. 6 is a conceptual drawing illustrating perspective views of a mobile device equipped with force sensors in accordance with aspects of the disclosure.
Figure 6:
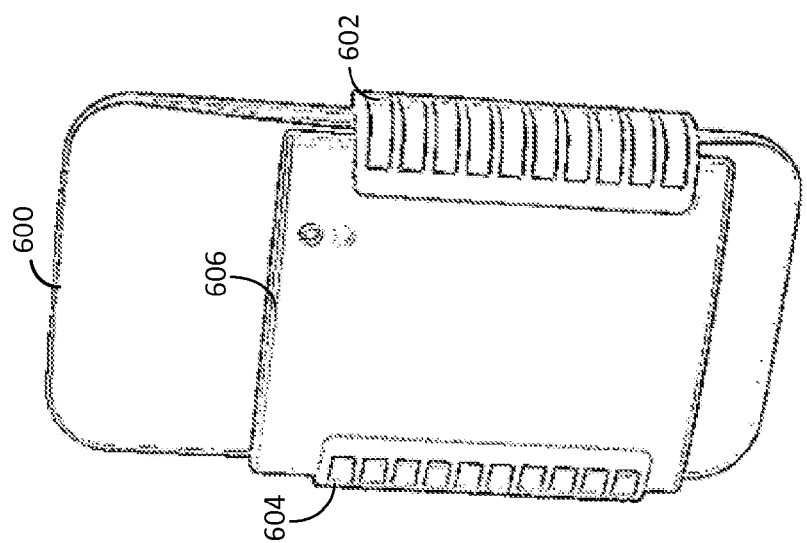

FIG. 6 is a conceptual drawing illustrating perspective views of a mobile communications device 600 equipped with arrays of force sensors in accordance with aspects of the disclosure. In one aspect, the mobile device 600 may be the handheld device 100. A first force sensor assembly 602 and a second force sensor assembly 604 are positioned on opposite edges of the mobile device 600. Each force sensor assembly includes an array of force sensors similar to the arrays 106 and 108 of FIG. 1. The first force sensor assembly 602, second force sensor assembly 604, and a support member 606 may form a force sensing sleeve for receiving at least a portion of the mobile device 600 therein. In some aspects, the force sensor assemblies may be integrally formed as portions of the mobile device. In some aspects, the force sensor assemblies may be optionally installed or removed by a user. In some aspects, the force sensor assemblies may be attached to the mobile device 600 without the support member 606.

Figure 7:
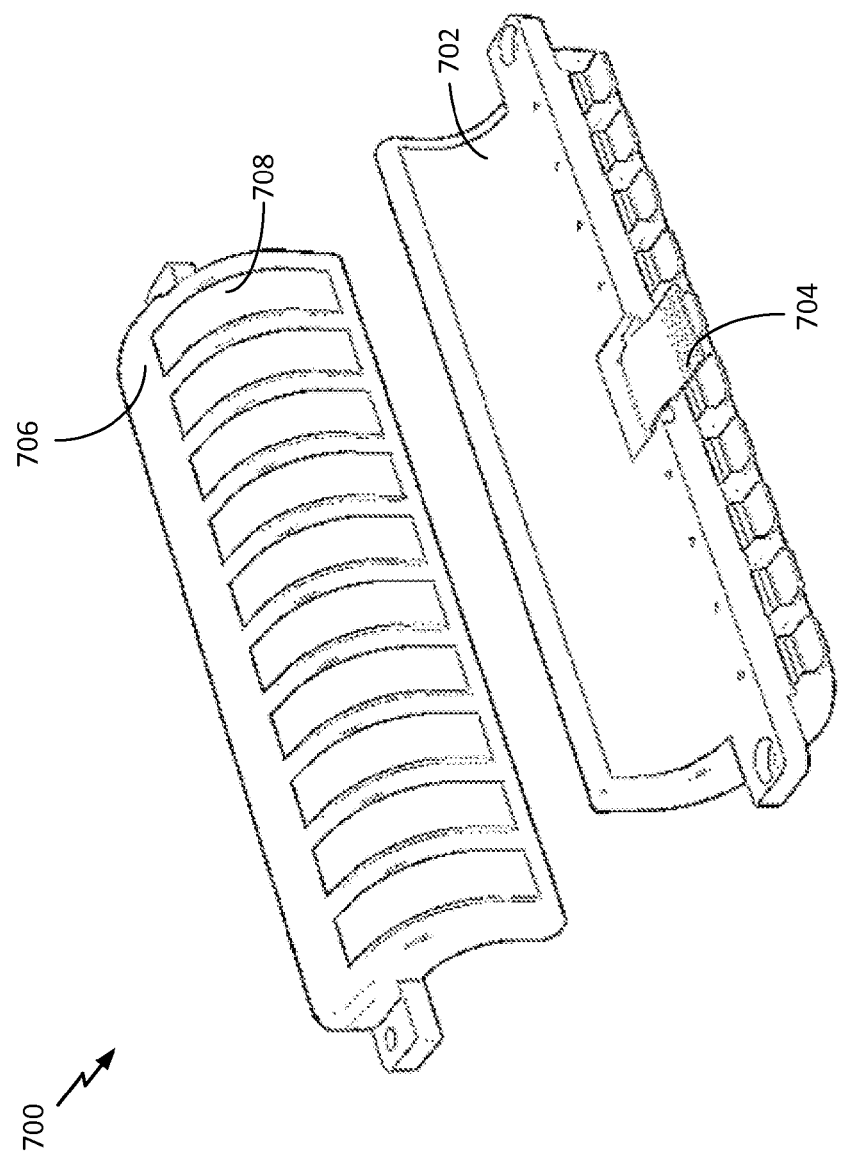
FIG. 7 is a conceptual drawing illustrating perspective views of a force sensor assembly in accordance with aspects of the disclosure.

FIG. 7 is a conceptual drawing illustrating two perspective views of a force sensor assembly 700 in accordance with aspects of the disclosure. The force sensor assembly 700 may be the first or second force sensor assembly 602 or 604. The force sensor assembly 700 includes a backer 702, a flexible circuit 704 (partially shown), and a cover 706. The force sensor assembly 700 may further include an array of force concentrators 708 arranged in a length direction of the assembly on the cover 706. The force concentrators 708 may move substantially independently from each other such that when a finger applies force at a specific force concentrator 708, the adjacent force concentrators 708 may not substantially receive the force. In some aspects, the force concentrators 708 may be replaced by a continuous sheet of material with suitable flexibility such that force received at a particular location on the sheet is not substantially coupled to the adjacent areas. The force sensor assembly 700 further includes a plurality of force sensors (not shown in FIG. 7 and to be described in more detail below) coupled to the flexible circuit 704 and located at positions corresponding to the force concentrators 708.

Figure 8:
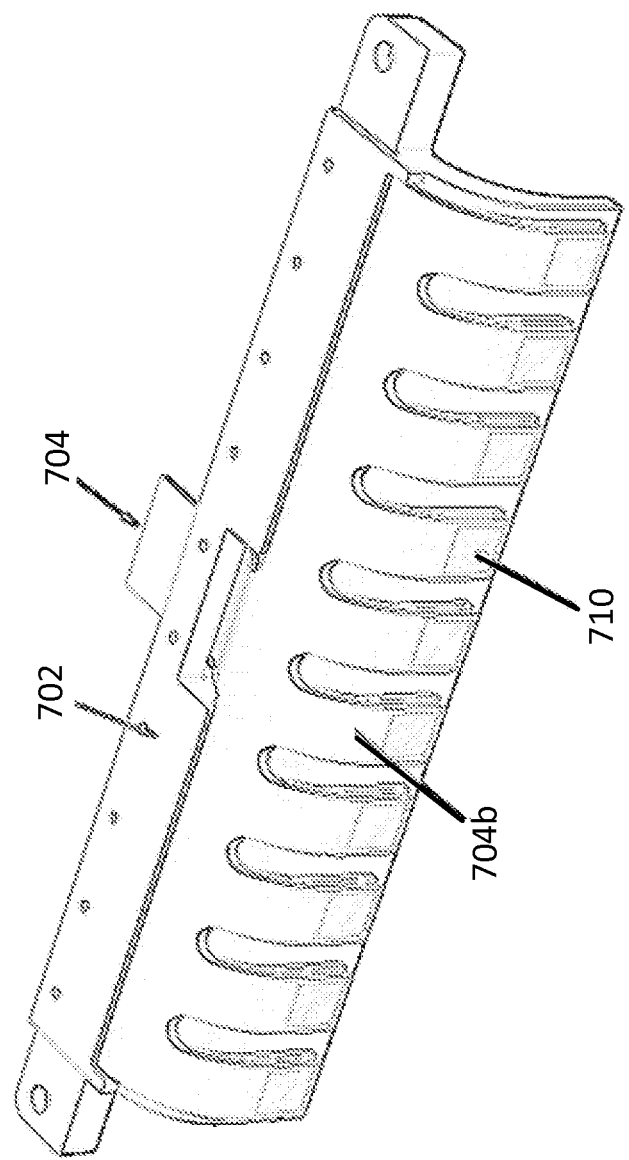
FIG. 8 is a conceptual drawing illustrating a perspective view of some components of the force sensor assembly of FIG. 7 in accordance with aspects of the disclosure.
Figure 9:
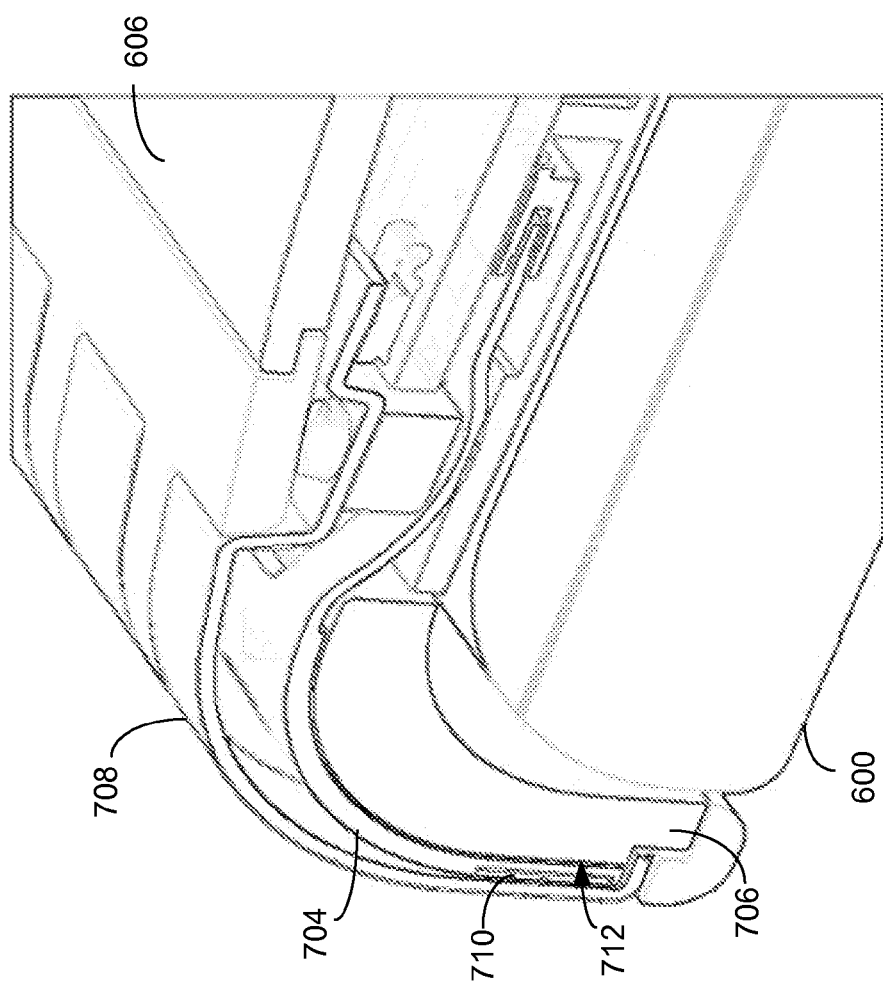
FIG. 9 is a conceptual drawing illustrating a cross sectional view of the force sensor assembly of FIG. 7 attached to a mobile device in accordance with aspects of the disclosure.

FIG. 8 is a conceptual drawing illustrating a perspective view of some components of the force sensor assembly 700 in accordance with aspects of the disclosure. FIG. 9 is a conceptual drawing illustrating a cross sectional view of the force sensor assembly 700 attached to a mobile device 600 in accordance with aspects of the disclosure. The flexible circuit 704 has a first portion 704a extending in a first direction (e.g., length direction) on a portion of the backer 702, and a number of finger portions 704b extending from the first portion 704a in a direction substantially perpendicular to the first direction. The backer 702 and the finger portions 704b may have a curvature or shape that conforms to a corresponding outside surface of a mobile device to which the force sensor assembly 700 may be installed. The force sensor assembly 700 further includes a number of force sensors 710 on the finger portions 704b, respectively. The force sensors 710 may be used as the force sensors of the arrays 106 and 108 in FIG. 1. In some aspects, each finger portion 704b may be physically and operatively coupled to a corresponding one of the force sensors 710. The flexible circuit 704 is configured to support communication and control functions to the force sensors 710. For example, the flexible circuit 704 may couple the force sensors 710 to a processing system (e.g., processing system 514) that may be used to control the force sensors 710 and receive information from the force sensors 710. In some aspects, an adhesive 712 may be used to secure the flexible circuit 704 on the backer 706. The flexible circuit 704 may be connected to a suitable connector (e.g., ZIF connector) on the support member 606.

Figure 10:
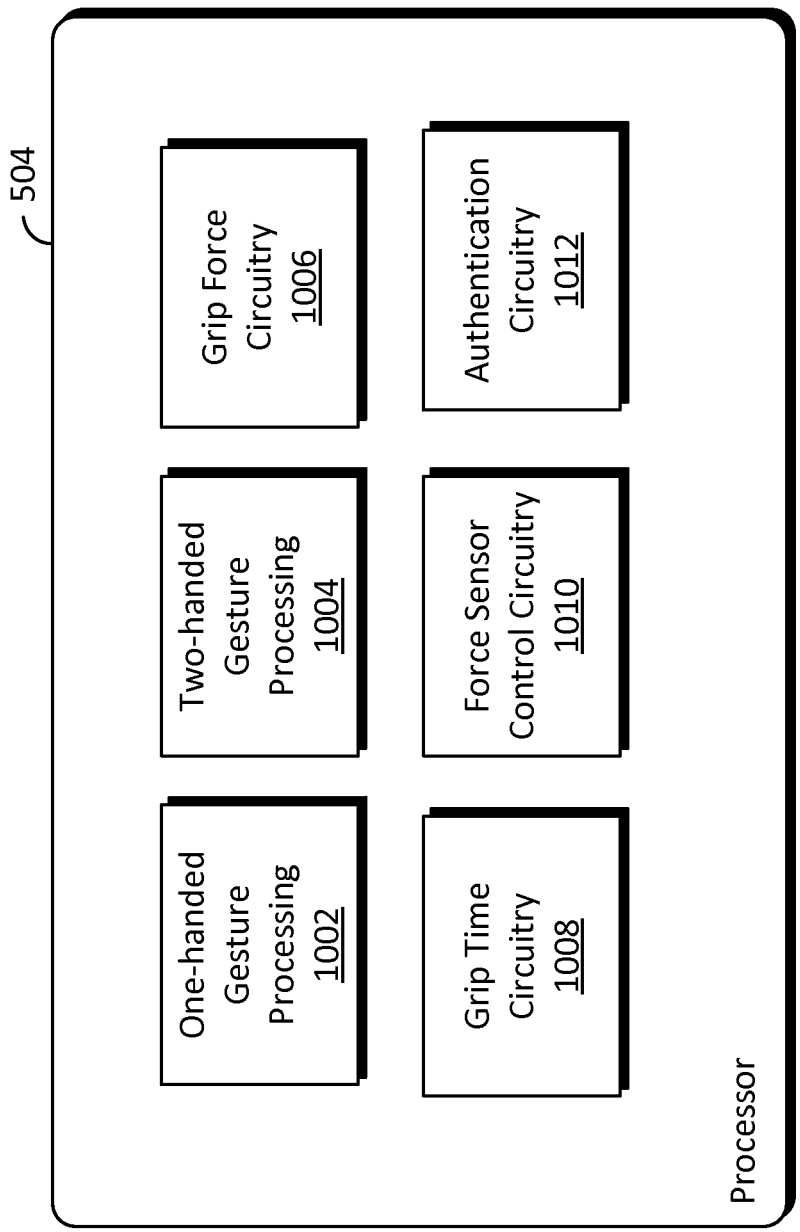
FIG. 10 is a conceptual block diagram illustrating some functional blocks of a processor of FIG. 5 in accordance with aspects of the disclosure.

FIG. 10 is a conceptual block diagram illustrating some functional blocks of the processor 504 of FIG. 5 in accordance with aspects of the disclosure. The processor 504 includes a number of circuitries configured to handle various interactions with an array of force sensors (e.g., arrays 106 and 108). For example, the processor 504 may include one-handed gesture processing circuitry 1002, two-handed gesture processing circuitry 1004, grip force circuitry 1006, grip time circuitry 1008, force sensor control circuitry 1010, and authentication circuitry 1012. The one-handed gesture processing circuitry 1002 is configured to handle the above-described one-handed gestures/patterns detected by the arrays of force sensors. The two-handed gesture processing circuitry 1004 is configured to handle the above-described two-handed gestures/patterns detected by the arrays of force sensors. The grip force circuitry 1006 is configured to quantify a signal proportional to a grip force magnitude that is sensed by the arrays of force sensors. The grip time circuitry 1008 is configured to determine the time duration a grip is detected. The force sensor control circuitry 1010 is configured to configure and control various functions of the arrays of force sensors including activation and deactivation of the sensors under different operating contexts and applications in use. The authentication circuitry 1012 is configured to authenticate a user by comparing a grip pattern detected by the arrays of force sensors with biometric data (e.g., predetermined grip patterns) stored at the device.

Figure 11:
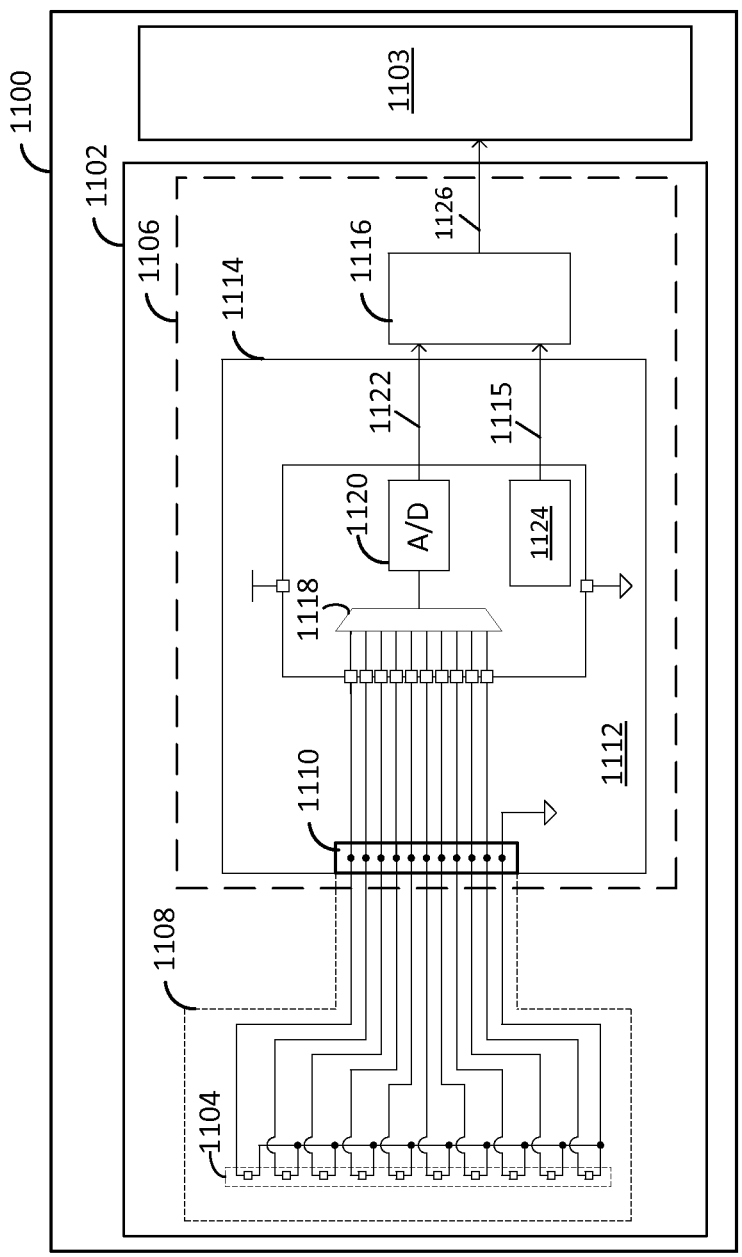
FIG. 11 is a conceptual block diagram illustrating a handheld device including a force sensor array system in accordance with aspects of the disclosure.

FIG. 11 is a conceptual block diagram illustrating some functional components of a handheld device 1100 including a force sensor array system 1102 and application software 1103 in accordance with aspects of the disclosure. The handheld device 1100 may be implemented as the device 100. The force sensor array system 1102 includes an array of force sensors (e.g., 1×10 force sensors 1104) and a force sensor array measurement subsystem 1106. In one aspect, the sensors 1104, measurement subsystem 1106, and application software 1103 are all integrated into a handheld device. In some other aspects, the force sensor array system 1102 may be a separate unit that is operatively connected to the handheld device 1100. For example, the force sensor array system 1102 may be a force sensing sleeve similar to the one shown in FIG. 6.

The force sensor array system 1102 is responsible for sensing, measuring, and reporting force or pressure data to the application software 1103. The standard unit for reporting force data is the unit Newton. The standard unit for reporting pressure data is the unit Pascal, which is equivalent to the force in Newton's divided by the surface area that the force applied to in square meters.

The application software 1103 is configured for interpreting the force or pressure data that is received from the measurement subsystem 1106, and acting on this information as designed (e.g., providing a user interface). The force sensor array system 1102, in this aspect, incorporates two main components, which are the force sensor array components subsystem 1108 and the force sensor array measurement subsystem 1106.

In one aspect, the force sensor array components subsystem 1108 may be an assembly that includes one or more arrays of individual force sensor components (e.g., ten force sensors 1104) within a flexible printed circuit. Here, the flexible printed circuit may mate directly to a zero insertion force (ZIF) connector 1110 that may reside on a circuit board 1112 within the handheld device 1100. The individual force sensor components 1104 may be of any suitable type, such as piezoresistive strain gauge, capacitive type, electromagnetic type, piezoelectric type, optical, potentiometric, etc. In some aspects, the force sensor components 1104 may be capacitive or resistive types.

The force sensor array measurement subsystem 1106 includes a force sensor measurement hardware 1114 and force sensor measurement software 1116 in a suitable storage memory. The force sensor measurement hardware 1114 may include the ZIF connector 1110 to provide a physical interface to the force sensor array components subsystem 1108. One terminal (e.g., the bottom terminal in FIG. 11) of each force sensor component 1104 is connected to a ground potential of the force sensor measurement hardware 1114. Another terminal of each force sensor component 1104 (e.g., the top terminal in FIG. 11) is routed to a corresponding input of a multiplexer 1118. The inclusion of the multiplexer 1118 allows for a single force sensor analog-to-digital converter circuit 1120 to be utilized in a time-multiplexed manner. In other aspects, a different architecture may be realized that includes more than one instance of the force sensor analog-to-digital converter circuit 1120, which can facilitate simultaneous measurements of more than one force sensor component 1104.

The force sensor analog-to-digital converter 1120 is configured to convert a property (e.g., pressure or force) measured or sensed by the force sensor component 1104 to raw measurement data 1122. For example, if the force sensor component 1104 is a resistive type sensor, the force sensor analog-to-digital converter 1120 is configured to convert a measured resistance to a corresponding digital value that may be proportional to the resistance measured by the force sensor component 1104. If the force sensor component 1104 is a capacitive type sensor, then the force sensor analog-to-digital converter 1120 is configured to convert the measured capacitance to a digital value that may be proportional to the capacitance measured by the force sensor component 1104.

The force sensor measurement hardware 1114 may also include a non-volatile memory 1124 for storing calibration parameters 1115. These calibration parameters are used by the force measurement software 1116 to convert the raw measurement data 1122 to either force or pressure data for use by the application software 1103. The calibration parameters may be derived during the product development phase by applying known forces or pressures to the force sensor components 1104, capturing the raw measurement data 1122, and then determining the calibration parameters (example: slope and y-intercept parameters) that will allow the downstream force sensor measurement software 1116 to convert the raw measurement data to either corresponding force or pressure data 1126.

Figure 12:
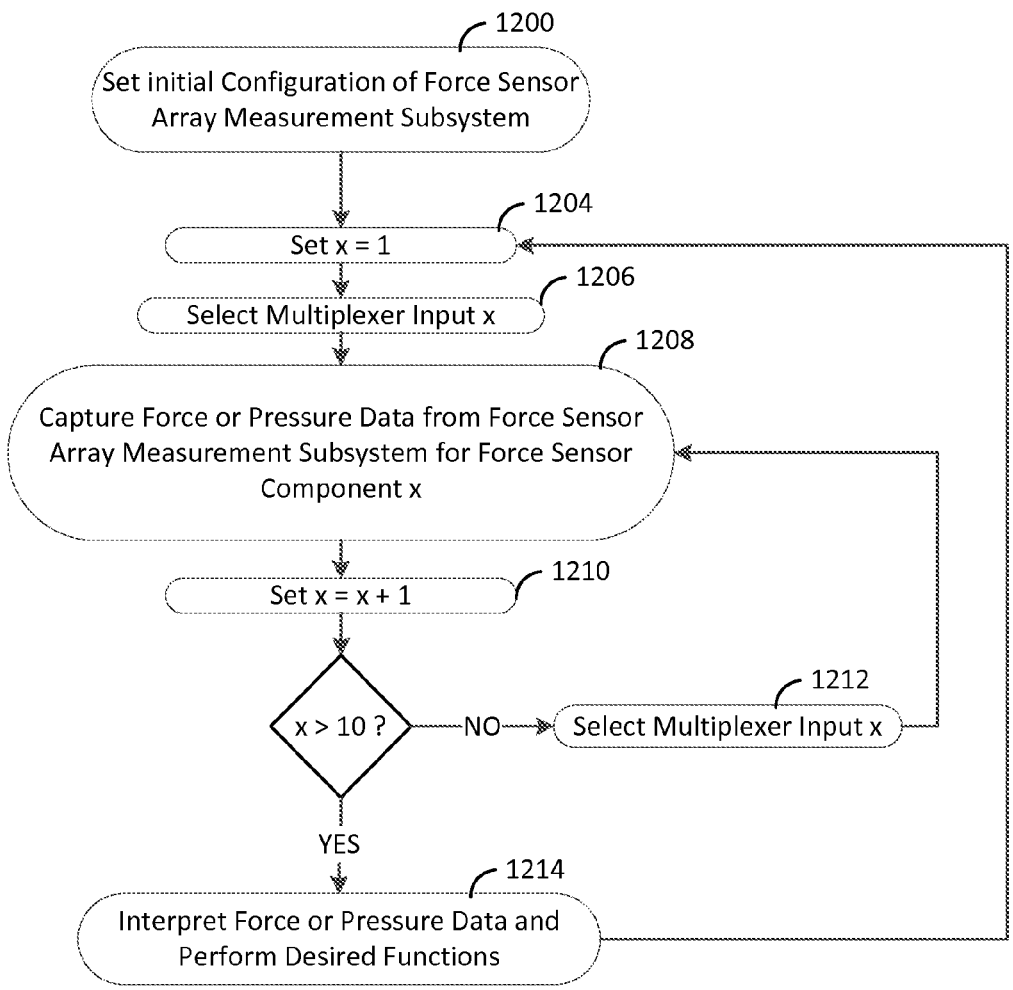
FIG. 12 is a flow chart illustrating an example state machine that may be realized within the handheld device of FIG. 11 in accordance with aspects of the present disclosure.

FIG. 12 is a flow chart illustrating an example of a process 1200 that may be realized within the application software 1103 shown in FIG. 11 in accordance with aspects of the present disclosure. In block 1202, an initial configuration of a force sensor array measurement subsystem 1106 is performed or set. This may include the application software 1103 issuing suitable commands as needed to power up the force sensor measurement hardware (e.g., force sensor array system 1102), and then waiting for the hardware to stabilize. This initial configuration may also include commands sent to the force sensor array measurement subsystem 1106 to identify whether force and/or pressure data is desired, which force sensor array components subsystem 1108 it is seeking to capture data for, for applications where there is more than one force sensor array components subsystem, or which individual force sensor components 1104 it is seeking to capture data for. In addition, other parameters may be passed to the force sensor array measurement subsystem 1108, such as the desired measurement time for each individual force sensor component 1104. This may be useful in applications where the force sensor array components 1104 are capacitive, as often there is a trade-off between measurement time and signal-to-noise ratio for this force sensor type.

Next, in block 1204, a loop count variable x is set to 1, followed by selecting Multiplexer Input x in block 1206. For example, one of the inputs of the multiplexer 1118 may be selected. In block 1208, the application software 1103 captures the force or pressure data from the force sensor array measurement subsystem 1108 for a force sensor component x (e.g., 1104). Then, in block 1210, the loop count variable x is set (or incremented) to x+1. If the new value for x is not greater than 10 (in this example, a total of 10 individual force sensor components 1104 are utilized), then the Multiplexer Input x is selected in block 1212. This inner loop (1208, 1201, and 1210) is repeated until force or pressure data for all individual force sensor components 1104 have been captured.

After force or pressure data for all individual force sensor components 1104 have been captured, the application software 1103 then interprets the data and performs any desired responses or functions in block 1214. Then, the entire process is repeated starting back at the block 1204 where the loop count variable x is set to 1, forming a larger outer loop.

Figure 13:
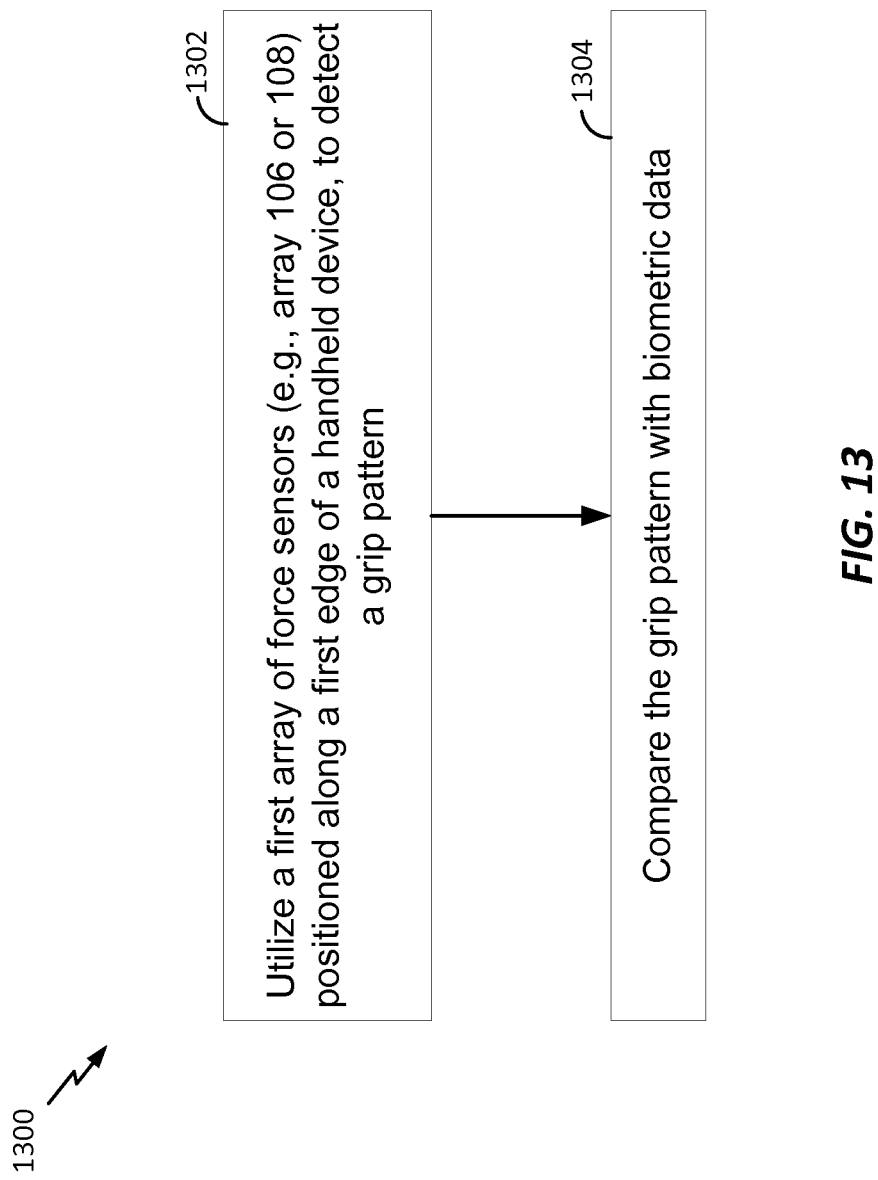
FIG. 13 is a flow chart illustrating a method of operating a handheld device equipped with an array of force sensors in accordance with an aspect of the disclosure.

FIG. 13 is a flow chart illustrating a method 1300 of operating a handheld device equipped with an array of force sensors in accordance with an aspect of the disclosure. The handheld device may be the handheld device 100. The method includes utilizing (1302) a first array of force sensors (e.g., array 106 or 108) positioned along a first edge of a handheld device 100, to detect a grip pattern; and comparing (1304) the grip pattern with biometric data. The biometric data may include a predetermined grip pattern of a user. In some aspects, the predetermined grip pattern may be generated and stored at the device when a user operates the device for the first time. In some aspects, the biometric data may be updated or changed according to the intended users.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Figure 15:
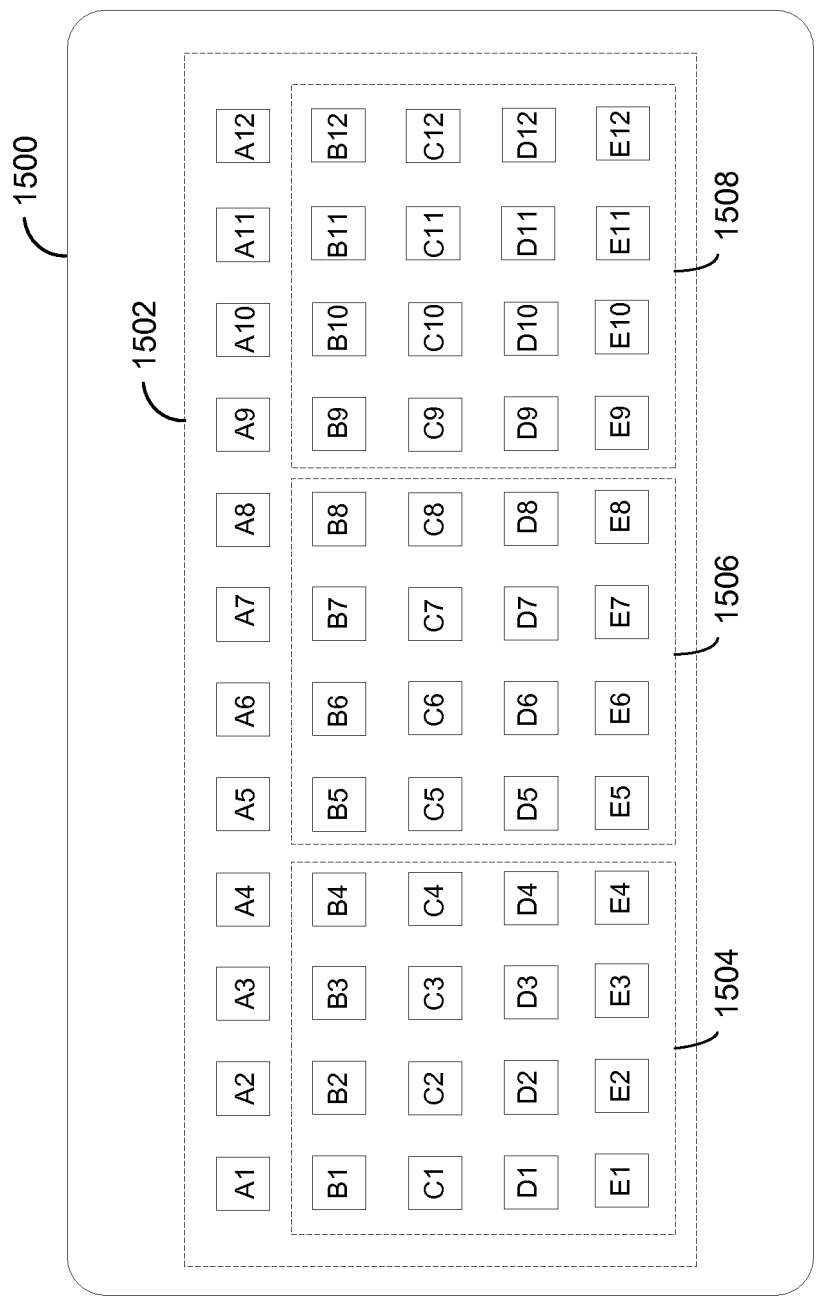
FIG. 15 is a conceptual drawing illustrating a rear side of a handheld device with a matrix of force sensors 1502 in accordance with an aspect of the disclosure.

FIG. 15 is a conceptual drawing illustrating a rear side or surface of a handheld device 1500 with force sensors arranged as a matrix 1502 in accordance with an aspect of the disclosure. This handheld device 1500 may be the handheld device 1100 described in FIGS. 11 and 12. In this example, the matrix 1502 is arranged as a 5×12 matrix, for a total of 60 force sensors. The force sensors 710 may be used as the force sensors 1504. If the handheld device 1500 features a display on its front surface (e.g., display portion 104 in FIG. 1), and the user is viewing the display in a landscape orientation, then one can imagine the user's fingers wrapping around the device 1500 and interacting with this force sensor matrix 1502. That is, the matrix 1502 may provide another user interface to control the handheld device 1500.

In one example, if the user is viewing a photo album in the landscape orientation, the application software 1103 may be configured to interpret a press-and-release activity by user's right hand fingers on the rear surface of the handheld device 1500 to display the next photo. Here, the application software 1103 may detect a significant force increase by one or more of the force sensors in a 4×4 sub-matrix 1504 that is bounded by sensors B1, B4, E1 and E4, followed by a significant decrease in force, as an event that may trigger a certain response (e.g., display next photo) from the handheld device 1500. Similarly, this scheme may be utilized to select the next track if the user is listening to music or watching videos. For example, a press-and-hold activity may be used for fast forwarding audio or video. The magnitude of the force may be used to determine the rate at which the audio or video content is fast forwarded.

Similarly, if the application software 1103 detects a press-and-release activity in a 4×4 sub-matrix 1506 that is bounded by sensors B5, B8, E5 and E8, then this may be interpreted as the user seeking to toggle between stop and pause within a music or video playback scenario.

If the application software 1103 detects a press-and-release activity in a 4×4 sub-matrix 1508 that is bounded by sensors B9, B12, E9 and E12, then this may trigger the device to display the previous photo within a photo album viewing scenario, or the previous track if the user is listening to music or watching videos. In some aspects, a press-and-hold activity may be used for rewinding audio or video. The magnitude of the force may be used to determine the rate at which the audio or video content is rewound.

In some aspects, the handheld device 1500 may feature an integrated camera. Then the force sensor matrix 1502 may be used to indicate a desired focus point that is not in the center of the frame. This may better allow the user to keep the device held steady during the process of capturing a photo or video. In various aspects, providing a force sensor matrix 1502 on the rear of the handheld device may provide an additional and more natural user interface for some applications, where less hand movement is desired (e.g., photo/video taking).

In one aspect of the disclosure, a handheld device 100 includes a processor (e.g., processor 504) and a first array of force sensors (e.g., array 106 or 108) operatively coupled to the processor, and positioned along a first edge of the handheld device. The first array is configured to detect a grip corresponding to a plurality of fingers of a user holding the handheld device, and the processor is configured to perform a user interface operation corresponding to the detected grip. The user interface operation may be any of the interactions described above in reference to the drawings.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A handheld device comprising:
   a display;
   a processor; and
   a first array of force sensors operatively coupled to the processor, and positioned along a first edge of the handheld device, the first array being configured to detect a grip pattern,
   wherein the processor is configured to:
      associate the detected grip pattern with a user input to an application that the user is interacting with;
      quantify the grip pattern in accordance with a magnitude of a grip force applied by the user;
      select a target on the display based on the magnitude of the grip force; and
      dynamically reconfigure the association between the detected grip pattern and the user input based on an interaction between the user and the application.

2. The handheld device of claim 1, wherein the processor is further configured to:
   compare the grip pattern with biometric data, wherein the biometric data comprise a user specific grip pattern; and
   authenticate a user based on the comparison.

3. The handheld device of claim 1, wherein the processor is further configured to perform a user interface operation corresponding to the detected grip pattern.

4. The handheld device of claim 1, wherein a distance between adjacent sensors of the first array is substantially equal to or smaller than a width of a finger of a user.

5. The handheld device of claim 1, wherein the processor is further configured to detect a number of the force sensors gripped by a user.

6. The handheld device of claim 5, wherein the processor is further configured to identify one or more force sensors gripped by the user among the first array of force sensors.

7. The handheld device of claim 1, wherein the processor is further configured to determine a time duration corresponding to each of the force sensors being gripped.

8. The handheld device of claim 1, further comprising
a second array of force sensors positioned along a second edge of the handheld device opposite to the first edge of the handheld device, and operatively coupled to the processor, the second array being configured to detect a grip pattern, and
wherein the processor is further configured to perform a user interface operation corresponding to the grip pattern detected by the second array.

9. The handheld device of claim 1, further comprising:
a mobile communications device; and
a sleeve for receiving at least a portion of the mobile communications device therein,
wherein the first array of force sensors is integrally formed along an edge of the sleeve.

10. The handheld device of claim 1, wherein each force sensor of the first array has a curvature substantively conforming to a shape of the handheld device.

11. The handheld device of claim 1,
wherein the first array comprises:
a flexible circuit comprising
a first portion extending in a first direction along the edge of the handheld device; and
a plurality of finger portions extending from the first portion in a second direction substantially perpendicular to the first direction, and
wherein the force sensors comprise a plurality of pressure sensors, each of the pressure sensors being positioned at an end of a corresponding one of the finger portions, spaced apart from the first portion of the flexible circuit.

12. The handheld device of claim 1, wherein the processor is configured to associate the grip pattern detected by the first array with a user input to the handheld device.

13. The handheld device of claim 12, wherein the grip pattern comprises position information and grip force magnitude information detected by the force sensors.

14. The handheld device of claim 12, wherein the grip pattern corresponds to a call handling function of the handheld device.

15. The handheld device of claim 12, wherein the grip pattern corresponds to a menu or list handling function of the handheld device.

16. The handheld device of claim 12, wherein the grip pattern corresponds to a locking or unlocking function of the handheld device.

17. The handheld device of claim 1,
wherein the first array is configured to manipulate an object displayed on the display.

18. The handheld device of claim 1, further comprising
a touchscreen display,
wherein the first array is configured to function in coordination with the touchscreen display to provide a two-handed interface with the handheld device.

19. The handheld device of claim 18, further comprising
a matrix of force sensors on a side of the handheld device opposite the touchscreen display,
wherein the matrix of force sensors are configured to function in coordination with the touchscreen display to provide a user interface for the handheld device.

20. The handheld device of claim 1, further comprising:
a plurality of force concentrators configured to move substantially independently from each other, wherein the first array of force sensors are respectively located at positions corresponding to the force concentrators.

21. The handheld device of claim 1, wherein the processor is further configured to dynamically reconfigure the association by:
individually activating or inactivating one or more force sensors of the first array depending on the interaction.

22. A method for operating a handheld device, comprising:
utilizing a first array of force sensors positioned along a first edge of the handheld device, to detect a grip pattern;
associating the detected grip pattern with a user input to an application that the user is interacting with;
quantifying the grip pattern in accordance with a magnitude of a grip force applied by the user;
selecting a target on a display of the handheld device based on the magnitude of the grip force; and
dynamically reconfiguring the association between the detected grip pattern and the user input based on an interaction between the user and the application.

23. The method of claim 22, further comprising:
comparing the grip pattern with biometric data, wherein the biometric data comprise a user specific grip pattern; and
authenticating a user based on the comparison.

24. The method of claim 22, further comprising performing a user interface operation corresponding to the detected grip pattern.

25. The method of claim 22, wherein a distance between adjacent sensors of the first array is substantially equal to or smaller than a width of a finger of a user.

26. The method of claim 22, further comprising detecting a number of the force sensors gripped by a user.

27. The method of claim 26, further comprising identifying one or more force sensors gripped by the user among the force sensors.

28. The method of claim 22, further comprising determining a time duration corresponding to each of the force sensors being gripped.

29. The method of claim 22, further comprising:
utilizing a second array of force sensors positioned along a second edge of the handheld device opposite to the first edge, to detect a grip pattern; and
performing a user interface operation corresponding to the grip pattern detected by the second array.

30. The method of claim 22, further comprising associating the grip pattern detected by the first array with a corresponding user input operable on the handheld device.

31. The method of claim 30, wherein the grip pattern comprises position information and grip force magnitude information detected by the force sensors.

32. The method of claim 31, further comprising associating the grip pattern to a call handling function of the handheld device.

33. The method of claim 31, further comprising associating the grip pattern to a menu or list handling function of the handheld device.

34. The method of claim 31, further comprising associating the grip pattern to a locking or unlocking function of the handheld device.

35. The method of claim 22, further comprising utilizing the first array to manipulate an object displayed on the display of the handheld device.

36. The method of claim 22, further comprising utilizing the first array in coordination with a touchscreen display of the handheld device to provide a two-handed interface.

37. The method of claim 36, further comprising utilizing a matrix of force sensors in coordination with the touch-screen display of the handheld device to perform a user interface operation.

38. The method of claim 22, wherein dynamically reconfiguring the association comprises individually activating or inactivating one or more force sensors of the first array depending on the interaction.

39. A handheld device, comprising:
    means for utilizing a first array of force sensors positioned along a first edge of the handheld device, to detect a grip pattern;
    means for associating the detected grip pattern with a user input to an application that the user is interacting with;
    means for quantifying the grip pattern in accordance with a magnitude of a grip force applied by the user;
    means for selecting a target on a display of the handheld device based on the magnitude of the grip force; and
    means for dynamically reconfiguring the association between the detected grip pattern and the user input based on an interaction between the user and the application.

40. A non-transitory computer-readable medium operable on a handheld device, comprising:
    instructions for causing the handheld device to utilize a first array of force sensors positioned along a first edge of the handheld device, to detect a grip pattern;
    instructions for causing the handheld device to associate the detected grip pattern with a user input to an application that the user is interacting with;
    instructions for quantifying the grip pattern in accordance with a magnitude of a grip force applied by the user;
    instructions for selecting a target on a display of the handheld device based on the magnitude of the grip force; and
    instructions for causing the handheld device to dynamically reconfigure the association between the detected grip pattern and the user input based on an interaction between the user and the application.

* * * * *